United States Patent
Chan

(10) Patent No.: US 8,087,012 B2
(45) Date of Patent: Dec. 27, 2011

(54) ELIMINATING MAXIMUM/MINIMUM OPERATIONS IN LOOP BOUNDS

(75) Inventor: Edwin Chan, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 1152 days.

(21) Appl. No.: 11/842,253

(22) Filed: Aug. 21, 2007

(65) Prior Publication Data

US 2009/0055815 A1   Feb. 26, 2009

(51) Int. Cl.
*G06F 9/45* (2006.01)

(52) U.S. Cl. ......... 717/160; 717/152; 717/154; 717/159

(58) Field of Classification Search .................. None
See application file for complete search history.

(56) References Cited

U.S. PATENT DOCUMENTS

| | | | | |
|---|---|---|---|---|
| 5,781,777 | A * | 7/1998 | Sato et al. ............. | 717/160 |
| 5,842,021 | A * | 11/1998 | Odani et al. ............ | 717/159 |
| 6,341,371 | B1 * | 1/2002 | Tandri .................. | 717/158 |
| 6,343,375 | B1 * | 1/2002 | Gupta et al. ........... | 717/152 |
| 6,507,947 | B1 * | 1/2003 | Schreiber et al. ....... | 717/160 |
| 6,665,864 | B1 | 12/2003 | Kawahito et al. | |
| 6,745,384 | B1 | 6/2004 | Biggerstaff | |
| 6,938,249 | B2 * | 8/2005 | Roediger et al. ........ | 717/160 |
| 6,988,266 | B2 | 1/2006 | Lam et al. | |
| 6,993,757 | B2 * | 1/2006 | Rajagopalan ........... | 717/160 |
| 7,086,046 | B2 * | 8/2006 | Barsness et al. ........ | 717/152 |
| 7,386,842 | B2 * | 6/2008 | Eichenberger et al. .... | 717/150 |
| 7,395,531 | B2 * | 7/2008 | Eichenberger et al. .... | 717/160 |
| 7,779,399 | B2 * | 8/2010 | Huang et al. ........... | 717/154 |
| 7,856,627 | B2 * | 12/2010 | Archambault et al. ..... | 717/151 |
| 2003/0097652 | A1 * | 5/2003 | Roediger et al. ........ | 717/160 |
| 2003/0208749 | A1 * | 11/2003 | Rajagopalan ........... | 717/158 |
| 2004/0221281 | A1 * | 11/2004 | Suganuma .............. | 717/151 |
| 2005/0283773 | A1 * | 12/2005 | Eichenberger et al. .... | 717/151 |
| 2006/0048119 | A1 * | 3/2006 | Ren et al. ............. | 717/160 |
| 2007/0169058 | A1 * | 7/2007 | Eichenberger et al. .... | 717/160 |

OTHER PUBLICATIONS

"Termination Analysis of Logic Programs Through Combination of Type-Based Norms", Maurice Bruynooghe, [online], Apr. 2007, pp. 1-44, [Retrived from Internet on Jul. 22, 2011], <http://delivery.acm.org/10.1145/1220000/1216378/p1-bruynooghe.pdf>.*

(Continued)

*Primary Examiner* — Tuan Dam
*Assistant Examiner* — Ziaul Chowdhury
(74) *Attorney, Agent, or Firm* — Cantor Colburn LLP; Libby Toub

(57) ABSTRACT

A technique is provided for eliminating maximum and minimum expressions within loop bounds are provided. A loop in a code is identified. The loop is determined to meet conditions, which require an upper loop bound and a lower loop bound to contain maximum and minimum expressions, loop-invariant operands, a predetermined size for a code size, and a total number of instructions to be greater than a predetermined constant. A profitability of loop versioning is determined based on a performance gain of a fast version of the loop, a probability of executing the fast version of the loop at runtime, and an overhead for performing loop versioning. A pair of lower loop bound and upper loop bound values resulting in a constant number is identified. A loop iteration value is checked to be a non-zero constant. Branches are identified, and loop versioning is performed to generate a versioned loop.

4 Claims, 2 Drawing Sheets

OTHER PUBLICATIONS

"Array Bounds Check Elimination for the Java HotSpot™ Client Compiler", Thomas Würthinger,[online], 2007, pp. 125-133,[Retrieved from Internet on Jul. 22, 2011], <URL: http://delivery.acm.org/10.1145/1300000/1294343/p125-wurthinger.pdf>.*

"Space-Efficient Scheduling of Nested Parallelism", Girija J. Narlikar et al., [online], 1999, pp. 138-173, [Retrieved from Internet on Jul. 22, 2011], <URL: http://delivery.acm.org/10.1145/320000/314607/p138-narlikar.pdf>.*

"Fast, Effective Dynamic Compilation", Joel Auslander et al., [online], 1996, pp. 1-11, Retrieved from Internet onJul. 22, 2011: <URL: http://citeseerx.ist.psu.edu/viewdoc/download?doi=10.1.1.41.4382&rep=rep1&type=pdf>.*

"Efficient and Effective Array Bound Checking", Thi Viet Nganguyen et al., [online], 2005, pp. 527-570, Retrived from Internet on Jul. 22, 2011, <URL http://citeseerx.ist.psu.edu/viewdoc/download?doi=10.1.1.123.7085&rep=rep1&type=pdf>.*

"Design and exploitation of a high-performance SIMD floating-point unit" , Catterfee S et al.[online], Mar. 2005,pp. 377-391, retrieved from Internet on Jul. 22, 2011 <URL: http://ieeexplore.ieee.org/stamp/stamp.jsp?tp=&arnumber=5388790>.*

Suganuma, et al, "Overview of the IBM Java Just-in-Tome (JIT) Compiler", IBM Systems Journal vol. 39, No. 1, 2000, pp. 175-193.

* cited by examiner

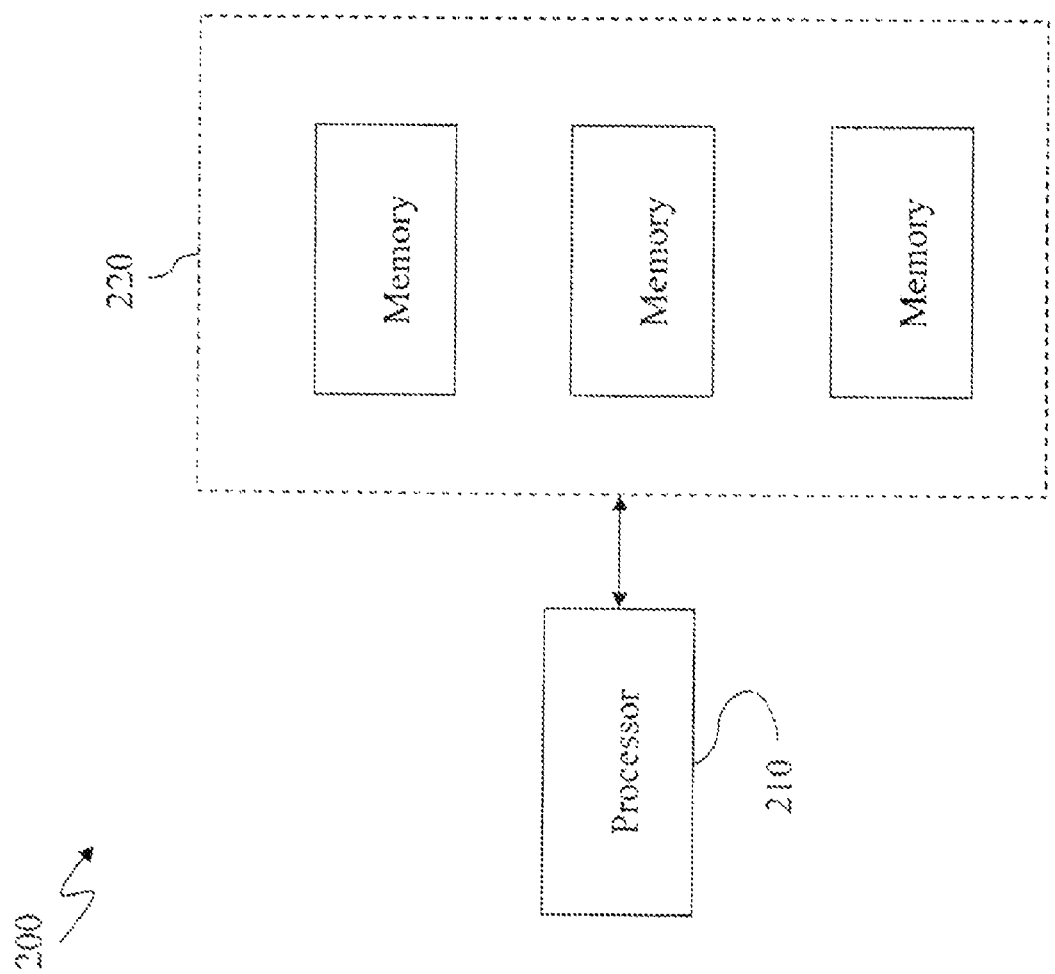

ELIMINATING MAXIMUM/MINIMUM OPERATIONS IN LOOP BOUNDS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

An exemplary embodiment of this invention relates to compiler optimizations, and particularly to a method and computer program product for eliminating maximum/minimum operations in loop bounds.

Compiler optimizers have always been looking for ways to eliminate maximum and minimum operations in the program. Existing optimization techniques include strength reduction of maximum and minimum operations and symbolic range propagation in an attempt to fold the maximum/minimum operations by proving that one of the operands in the maximum/minimum is always greater/smaller than the rest of the operands.

SUMMARY

A method for eliminating maximum and minimum expressions within loop bounds is provided in accordance with an exemplary embodiment. An unmodified loop in a code is identified. The method determines whether the unmodified loop in the code meets conditions to be identified as a candidate for loop versioning, which meeting the conditions for the unmodified loop require determining that an upper loop bound and a lower loop bound of the unmodified loop to-contain maximum and minimum expressions, and determining that operands in the maximum and minimum expressions are loop-invariant. The conditions also require that operands te-be loop-invariant relative to an outermost loop of a nested loop if the unmodified loop is a nested loop, determining that a code size of the unmodified loop does not exceed a predetermined size, and determining that a total number of instructions within the loop are greater than a predetermined constant.

Additionally, if the conditions are met, a profitability of loop versioning the unmodified loop is determined based on a multitude of factors for the loop, which include examining a performance gain of a fast version of the unmodified loop versus the unmodified loop, examining a probability of executing the fast version of the unmodified loop at runtime, and examining an overhead for performing loop versioning.

Further, a pair of lower loop bound and upper loop bound values that result in a constant number are identified from the maximum and minimum expressions of the unmodified. A loop iteration value is checked whether it is simplified into a non-zero constant. Branches are identified within the unmodified loop for branch folding opportunities. Loop versioning is performed on the unmodified loop to generate a versioned loop. The method examines the probability of executing the fast version of the unmodified loop at runtime is predicted utilizing only static analysis, in response to the pair of lower loop bound and upper loop bound values resulting in the constant number from the maximum and minimum expressions of the unmodified loop and in response to the loop iteration value being simplified into the non-zero constant.

A computer program product, tangibly embodied on a computer readable medium, for eliminating maximum and minimum expressions within loop bounds, is provided in accordance with the exemplary embodiment. The computer program product includes instructions for causing a computer to execute the above method.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates an apparatus in which the optimization may be implemented in accordance with the exemplary embodiment.

Figure 1:
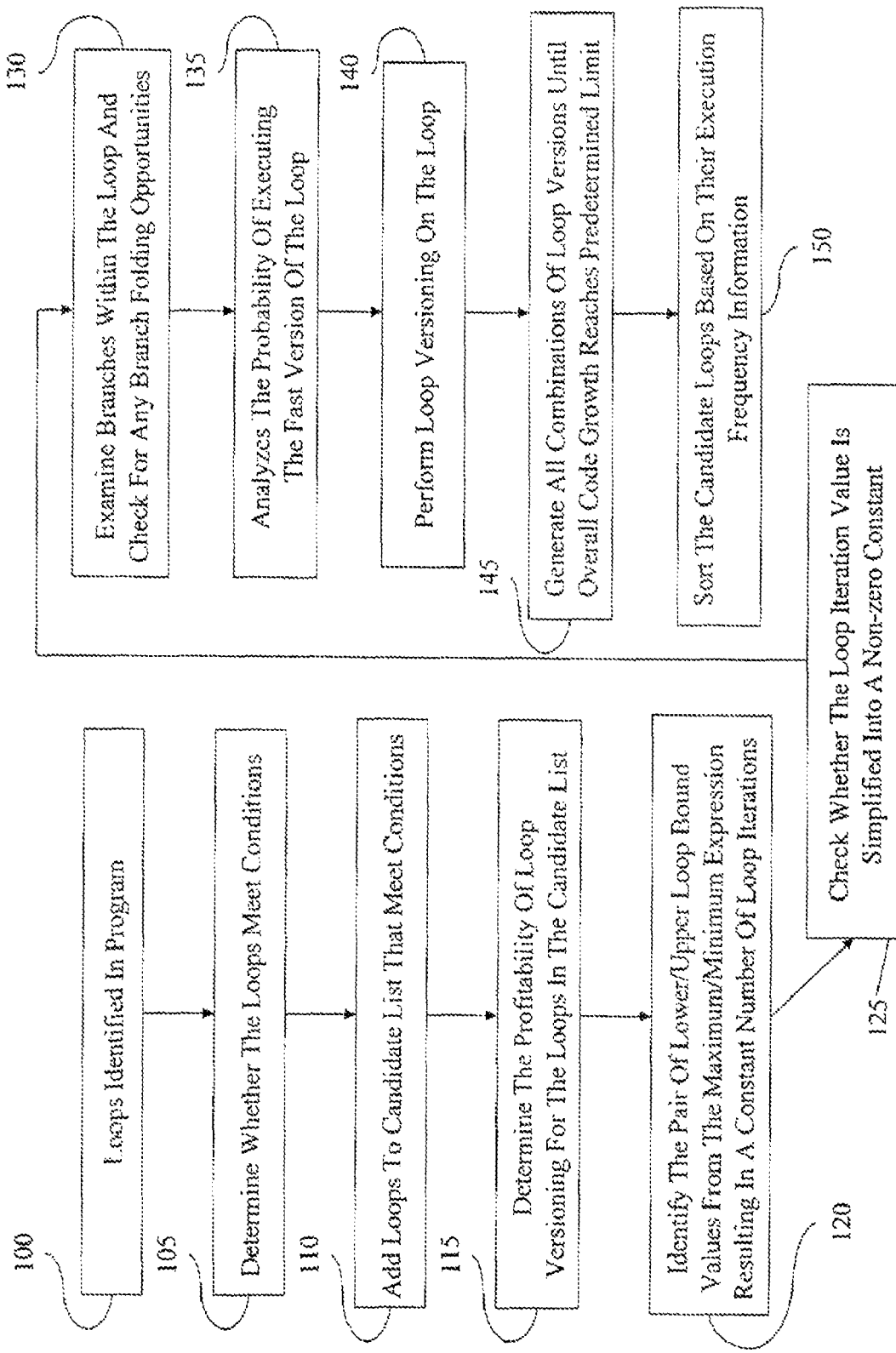
FIG. 1 illustrates a method for eliminating maximum and/or minimum expressions from a loop upper bound and/or loop lower bound via loop versioning in accordance with an exemplary embodiment.

The detailed description explains the exemplary embodiment of the invention, together with advantages and features, by way of example with reference to the drawings.

DETAILED DESCRIPTION

An exemplary embodiment provides a compiler optimization to eliminate maximum and/or minimum expressions that occur within the upper loop bound and/or lower loop bound via loop versioning to increase the execution speed of the loop. The maximum expression is an operation that returns the maximum value given at least two or more inputs, and the minimum expression is an operation that returns the minimum value given at least two or more inputs, although in practice maximum/minimum expressions usually receives only two inputs.

Maximum and minimum expressions can appear in the loop upper or lower bound, or the maximum and minimum expressions can be introduced by other loop transformations such as loop tiling or index set splitting. The occurrence of maximum/minimum expressions in the upper loop bound and/or lower loop bound can inhibit many loop optimizations, because maximum/minimum expressions increase the difficulty for other loop optimizations to determine the number of loop iterations.

In the exemplary embodiment loop versioning is a technique that creates multiple versions of a loop, each of which is guarded by different runtime conditions. The guard conditions generated determine which version of the loop is to be executed during runtime. The effectiveness of loop versioning depends on whether the more efficient versions are much more likely to be executed, and also whether the performance gained by executing the more efficient version is significant.

The exemplary embodiment provides optimizations to make the maximum/minimum expressions in the upper loop bound and/or lower loop bound redundant by applying loop versioning. The optimization may also address several known shortcomings with the existing solutions. Moreover, the existing techniques do not consider the adverse impact of maximum/minimum operations, appearing in the loop bounds, on loop optimizations. Furthermore, existing techniques treat maximum/minimum operations on an individual basis. However, the exemplary embodiment considers the relationships between the maximum/minimum operations in the same program statement to identify more potential maximum/minimum folding opportunities.

In the exemplary embodiment, operands in the maximum/minimum expressions do not necessarily need to be constant. Also, the exemplary embodiment does not require runtime profiling information in order to perform the transformation. Furthermore, the exemplary embodiment can identify more potential maximum/minimum folding opportunities than existing solutions by considering the relationships between maximum/minimum operations.

For a loop whose upper and/or lower loop bound consists of maximum/minimum expressions, the exemplary embodiment examines all the possible combinations between the maximum/minimum operations through symbolic simplifications to discover whether any of the combinations provides additional loop optimization opportunities and branch folding opportunities within the loop. This knowledge is utilized in determining the profitability of versioning the loop to eliminate the maximum/minimum expressions. In the exemplary embodiment, symbolic simplifications may include simplifying the expression by performing the expression with all the variables to determine if the expression can be reduced to a constant for all of the potential variables.

The exemplary embodiment performs loop versioning by duplicating the loop and by generating an additional loop guard above the loop for selecting which version of the loop to be executed. Subsequent dataflow optimizations can be applied to simplify the loop bounds of the versioned loop. The exemplary embodiment will expose more branch elimination and loop optimization opportunities in the versioned loop, and as a result, better runtime performance can be achieved.

FIG. 1 illustrates a method for eliminating maximum/minimum expressions from an upper loop bound/lower loop bound via loop versioning in accordance with an exemplary embodiment.

Loop versioning candidates need to be identified in the program, and upon receiving a computer program, the optimization analyzes the code to locate loops within the program at 100. When a loop is located, the optimization determines whether the loop meets certain conditions at 105, and the optimization determines that: (1) the upper/lower bound of the loop contains maximum/minimum expressions; (2) both operands in the maximum/minimum expressions are loop-invariant and are safe to be moved; (3) for nested loops, the operands are loop-invariant relative to the outermost loop; (4) the code size of the loop does not exceed a predetermined size threshold; and (5) the total number of instructions within the loop is at least greater than a predetermined constant. If the loop satisfies all of the above conditions, the loop may be added to the candidate list at 110.

The optimization determines the profitability of loop versioning at 115. Before the optimization performs versioning on the loops in the candidate list, the optimization must examine a trade off between the potential performance benefit and the loop versioning overhead. Factors that influence the profitability of loop versioning include: (1) the performance gain of the faster version over the original version; (2) the probability of executing the faster version at runtime; and (3) the overhead for loop versioning.

In order to speculate the performance gain of the fast version of the loop over the default version of the loop, various aspects of the loop are examined. The optimization attempts to identify the pair of lower and upper loop bound values from the maximum/minimum expression that results in a constant number of loop iterations by taking each possible pair of lower and upper loop bound values from the maximum/minimum expression at 120. As a non-limiting example, the optimization may calculate the loop iteration value using symbolic simplification. The optimization checks whether the loop iteration value is simplified into a non-zero constant at 125.

As a non-limiting example, the code segment below is provided to illustrate a candidate loop in Example 1:

```
x1=px-1;
x2=px+1;
if (x1<0) x1=0;
if (x2>maxX) x2=maxX;
for (x=x1; x<=x2; x++) {
  ...
}
```

EXAMPLE (1)

In the candidate loop of Example 1, the value of x1 is max(px−1,0), and the value of x2 is min(px+1,maxX). By going through all the possible combinations of x1 and x2, the optimization can determine that when x1=px−1 and x2=px+1, the number of loop iterations becomes a constant of 3. Therefore "px−1" and "px+1" are considered as the ideal lower and upper bound values for the variable "x".

Now referring back to FIG. 1, the optimization also examines the conditional branches within the loop that reference the induction variable for counting the iteration and checks for any branch folding opportunities, by substituting all possible lower and upper loop bound values for the loop's induction variable at 130. As a non-limiting example, a candidate loop containing a branch is illustrated in Example 2.

```
x1=px-1;
x2=px+1;
if (x1<0) x1=0;
if (x2>maxX) x2=maxX;
for (x=x1; x<=x2; x++) {
  if ((x!=px) {
    ...
  }
}
```

EXAMPLE (2)

In the candidate loop containing a branch in Example 2, after the optimization has identified the four possible ranges of values for x, which are [0, px+1], [0, maxX], [px−1, px+1] and [px−1, maxX], the optimization then substitutes both the lower value and the upper value of the range into the branch condition (x!=px) to identify branch folding opportunities. If the branch can be folded by both end values of the range, then the end values are considered as the ideal lower and upper bound value for the variable "x".

Referring back to FIG. 1, the optimization analyzes the probability of executing the fast version of the loop at 135. Traditionally, it is has been very difficult to accurately predict this probability without dynamic runtime profile information. In the exemplary embodiment, however, when only the static analysis information is available, both of the aforementioned conditions (i.e., the pair of lower and upper loop bound values from the maximum/minimum expression that results in a constant number of loop iterations is identified, and the loop iteration value calculated using symbolic simplification is a non-zero constant) must exist in the loop to prove there is potentially tremendous performance gain over the default loop. On the other hand, when dynamic runtime profiling is available, the runtime profiling information can be used to predict the return value of the maximum/minimum expression. The optimization then utilizes this runtime profiling information to predict the most likely value for the loop's lower and upper bound. If there is a high probability (e.g., a percentage near the high 90s) that the loop's lower/upper bound is equal to a certain value, then loop versioning will be applied regardless of whether the above two conditions exist in the loop. Using the runtime profile information obtained in a program training run, the compiler optimization can predict the most likely value for the loop's upper/lower bound as discussed in a non-limiting example below. For example, given an expression max (x, 10) that occurs in the loop upper bound, the runtime profile information will store the number of times max(x, 10) returns 10, and the number of times max(x, 10) returns x. If 99% of the time max(x, 10) returns 10, then the compiler optimization can predict the most likely value for the loop upper bound is 10.

Once the loop is deemed profitable for loop versioning at the operation 140, the loop is versioned by duplicating the loop body and inserting an additional guard expression just before the versioned loop at 140. The guard expression is needed to select the appropriate loop version at runtime, and the guard expression ensures that the ideal lower and upper loop bound values identified in the operation 120 are used by the versioned loop.

Moreover, since the optimization has already ensured that the branch overhead for loop versioning is negligible compared to the computations in the loop, in order to reduce the overhead of the branch for nested loops, the guard for the inner versioned loop may be inserted just outside of the outermost loop to avoid being executed multiple times in the inner loop. Also, if both inner and outer loops are versioned, then the guard condition for the inner versioned loop may be combined with the guard condition of the outer versioned loop.

As a non-limiting example, Example 3 illustrates the code after applying loop versioning and shows how the loop may be versioned by this optimization:

```
x1=px-1;
x2=px+1;
if (x1<0) x1=0;
if (x2>maxX) x2=maxX;
if (x1 > 0 && x2 < maxX) {
  for (x=x1; x<=x2; x++) {
    if ((x!=px) {
      ...
    }
  }
  ...
} else {
  for (x=x1; x<=x2; x++) {
    if ((x!=px) {
      ...
    }
  }
}
```

EXAMPLE (3)

As seen in Example 3 above that illustrates the code alter applying loop versioning to the candidate loops, if there are several pairs of ideal lower and upper loop bounds for the loop identified in the operation 120, then all the combinations of loop versions are generated until the overall code growth hits a certain predetermined limit at 145. The candidate loops are sorted based on their execution frequency information, which is obtained by static analysis or dynamic runtime profile information, so that the frequently executed loop is versioned before the cold loop at 150.

The exemplary embodiment allows subsequent compiler optimizations to recognize that the loop inside the taken branch can have only one possible lower bound and upper bound value. As a result, subsequent compiler optimizations can eliminate the branch and apply loop unrolling to the fast version of the loop. As a non-limiting example, Example 4 depicts an illustration of the final code after being transformed by other compiler optimizations:

```
x1=px-1;
x2=px+1;
if (x1<0) x1=0;
if (x2>maxX) x2=maxX;
if (x1 > 0 && x2 < maxX) {
  x = px - 1;
  ...
  x = px;
  ...
  x = px + 1;
  ...
} else {
  for (x=x1; x<=x2; x++) {
    if ((x!=px) {
      ...
    }
  }
}
```

EXAMPLE (4)

FIG. 2 illustrates a device in which the optimization may be implemented in accordance with the exemplary embodiment. The exemplary embodiment may be implemented in a device 200 (e.g., a general purpose computer), which includes a processor 210 executing computer program code stored on a storage medium, such as memory 220, in order to perform the processes described herein. The device 200 may include or may be operatively coupled to a display screen (not shown). It is understood that other processor-based devices (e.g., servers) may implement the exemplary processes described herein. The device 200 also includes all the necessary hardware and software to operate as a computing device to implement the exemplary embodiment.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the exemplary embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for eliminating maximum and minimum expressions within loop bounds, the method comprising:
    identifying an unmodified loop in a code;
    determining whether the unmodified loop in the code meets conditions to be identified as a candidate for loop versioning, wherein meeting the conditions for the unmodified loop comprises:
        determining that an upper loop bound and a lower loop bound of the unmodified loop contain maximum and minimum expressions;
        determining that operands in the maximum and minimum expressions are loop-invariant in the unmodified loop, the operands being loop-invariant relative to an outermost loop of a nested loop if the unmodified loop is the nested loop;
        determining that a code size of the unmodified loop does not exceed a predetermined size; and
        determining that a total number of instructions within the unmodified loop is greater than a predetermined constant;
    determining a profitability of loop versioning the unmodified loop based on a plurality of factors for the unmodified loop in response to the conditions being met, wherein determining the profitability using the plurality of factors comprise:
        examining a performance gain of a fast version of the unmodified loop versus the unmodified loop;
        examining a probability of executing the fast version of the unmodified loop at runtime; and
        examining an overhead for performing loop versioning;
    identifying a pair of lower loop bound and upper loop bound values that result in a constant number from the maximum and minimum expressions of the unmodified loop;
    checking whether a loop iteration value is simplified into a non-zero constant;
    examining branches within the unmodified loop for branch folding opportunities; and
    performing loop versioning on the unmodified loop to generate a versioned loop;
    wherein examining the probability of executing the fast version of the unmodified loop at runtime is predicted utilizing only static analysis, in response to the pair of lower loop bound and upper loop bound values resulting in the constant number from the maximum and minimum expressions of the unmodified loop and in response to the loop iteration value being simplified into the non-zero constant.

2. The method of claim 1, wherein the unmodified loop is a plurality of unmodified loops and performing loop versioning generates a plurality of versioned loops;
    wherein combinations of the plurality of versioned loops are generated until the code reaches a predetermined limit; and
    wherein the plurality of versioned loops are sorted based on execution frequency information.

3. A computer program product, tangibly embodied on a non-transitory computer readable medium, for eliminating maximum and minimum expressions within loop bounds, the computer program product including instructions for causing a computer to execute a method, comprising:
    identifying an unmodified loop in a code;
    determining whether the unmodified loop in the code meets conditions to be identified as a candidate for loop versioning, wherein meeting the conditions for the unmodified loop comprises:
        determining that an upper loop bound and a lower loop bound of the unmodified loop contain maximum and minimum expressions;
        determining that operands in the maximum and minimum expressions are loop-invariant in the unmodified loop, the operands being loop-invariant relative to an outermost loop of a nested loop if the unmodified loop is the nested loop;
        determining that a code size of the unmodified loop does not exceed a predetermined size; and
        determining that a total number of instructions within the unmodified loop are greater than a predetermined constant;
    determining a profitability of loop versioning the unmodified loop based on a plurality of factors for the unmodified loop in response to the conditions being met, wherein determining the profitability using the plurality of factors comprise:
        examining a performance gain of a fast version of the unmodified loop versus the unmodified loop;
        examining a probability of executing the fast version of the unmodified loop at runtime; and
        examining an overhead for performing loop versioning;
    identifying a pair of lower loop bound and upper loop bound values that result in a constant number from the maximum and minimum expressions of the unmodified loop;
    checking whether a loop iteration value is simplified into a non-zero constant;
    examining branches within the unmodified loop for branch folding opportunities; and
    performing loop versioning on the unmodified loop to generate a versioned loop;
    wherein examining the probability of executing the fast version of the unmodified loop at runtime is predicted utilizing only static analysis, in response to the pair of lower loop bound and upper loop bound values resulting in the constant number from the maximum and minimum expressions of the unmodified loop and in response to the loop iteration value being simplified into the non-zero constant.

4. The computer program product of claim 3, wherein the unmodified loop is a plurality of loops and performing loop versioning generates a plurality of versioned loops;
    wherein combinations of the plurality of versioned loops are generated until the code reaches a predetermined limit; and
    wherein the plurality of versioned loops are sorted based on execution frequency information.

* * * * *